United States Patent [19]

Coassolo et al.

[11] Patent Number: 5,013,819

[45] Date of Patent: May 7, 1991

[54] LIQUID-CRYSTALLINE, THERMOTROPIC AROMATIC POLYESTERS

[75] Inventors: Alfredo Coassolo; Marco Foa'; L. Lawrence Chapoy, all of Novara, Italy

[73] Assignee: Montedison S.P.A., Milan, Italy

[21] Appl. No.: 430,942

[22] Filed: Nov. 2, 1989

Related U.S. Application Data

[63] Continuation of Ser. No. 280,644, Dec. 6, 1988, abandoned.

[30] Foreign Application Priority Data

Dec. 10, 1987 [IT] Italy ............................. 22930 A/87

[51] Int. Cl.$^5$ .................. C08G 63/02; C08G 63/18
[52] U.S. Cl. ................................. 528/193; 524/601; 525/431; 528/190; 528/191; 528/192
[58] Field of Search .............. 528/190, 191, 192, 193; 524/601; 525/437

[56] References Cited

U.S. PATENT DOCUMENTS

| 4,153,779 | 5/1979 | Jackson, Jr. et al. | 528/193 |
| 4,398,018 | 8/1983 | Akkapeddi et al. | 528/193 |
| 4,600,765 | 7/1986 | Lee et al. | 528/193 |
| 4,614,790 | 9/1986 | Hutchings et al. | 528/193 |
| 4,668,760 | 5/1987 | Boudreaux, Jr. et al. | 528/193 |

FOREIGN PATENT DOCUMENTS 1507207 4/1978 United Kingdom .
1508646 4/1978 United Kingdom .

OTHER PUBLICATIONS

Chemical Abstracts, vol. 111, No. 6, 7th Aug., 1989, p. 74, No. 40877h.
Chemical Abstracts, vol. 101, No. 4, 23rd Jul., 1984, p. 13, No. 24143d.
Patent Abstracts of Japan, vol. 7, No. 7 (C-144) [1152], 12th Jan., 1983; & JP-A-57 164 120.

Primary Examiner—Harold D. Anderson
Assistant Examiner—T. Mosley
Attorney, Agent, or Firm—Stevens, Davis, Miller & Mosher

[57] ABSTRACT

Liquid-crystalline, thermotropic, aromatic polyesters processable in the molten state, comprising units derived from hydroquinone mono- and possibly di-substituted with aralkyl groups.

12 Claims, No Drawings

LIQUID-CRYSTALLINE, THERMOTROPIC AROMATIC POLYESTERS

This application is a continuation of application Ser. No. 280,644, filed Dec. 6, 1988, now abandoned.

DESCRIPTION OF THE INVENTION

The present invention relates to liquid-crystalline, thermotropic, aromatic polyesters.

More particularly, the present invention relates to liquid-crystalline, thermotropic, aromatic polyesters easily processable in the molten state, and having the mesogen group in their main chain.

Thermotropic polyesters, which hence show an optical anisotropy in the molten state, are products known and described in many examples in the technical literature, such as in British Polymer Journal (Dec. 1980), page 154: "Liquid Crystal Polymer"; Journal of Macromoleclar Science-Chemistry (1984), page 1705: "Liquid Crystalline Aromatic Polyesters"; Die Angewandte Makromolekulare Chemie (1982), 109–110, page 1; "Rigid Chain Polymers"; Die Angewandte Makromoleculare Chemie (1986), 145–146, page 231: "Thermotropic Liquid Crystalline Polymers"; Journal of Molecular Science Review (1986) C26(4), page 551: "Liquid Crystalline Polymers: A Novel State of Material."

The use of such polyesters makes it possible for high-tenacity fibers or molded articles to be obtained from the material in the molten state, such as, e.g., by injection-molding, which fibers or molded articles are endowed with suitable characteristics of rigidity, hardness and toughness.

The polymers showing the above properties are generally easily processable in the molten state, highly resistant to heat and oxidation and furthermore, thanks to their crystallinity, such polymers display high HDT (Heat Distortion Temperature) values and are highly resistant to attack by solvents.

Liquid-crystalline, thermotropic polyesters having the above mentioned characteristics, and particularly suitable for preparing fibers or films are disclosed in U.S. Pat. No. 4,447,593.

These polyesters contain units derived from a dicarboxy aromatic acid, possibly from a hydroxy-aromatic acid, and a phenol constituted by a hydroquinone mono-substituted with alkyl or aralkyl groups respectively containing at least 5, or at least 7 carbon atoms.

The mono-substituted hydroquinone may be used, in admixture with up to 10 mol %, with another phenol selected from hydroquinone as such, or hydroquinone substituted with a group different from the above-cited groups. Examples of these substituted hydroquinones are methyl-, ethyl- propyl-, tert.-butyl-hydroquinones, chloro-hydroquinones and bromo-hydroquinones.

Furthermore, the mono-substituted alkyl or aralkyl hydroquinones may be used, in admixture with up to 10 mol %, with other aromatic diols such as resorcinol, 2,2.bis-(4-hydroxy-phenyl)-propane, bis(4-hydroxy-phenyl)-sulphone, 1,1-bis(4-hydroxy-phenyl)cyclohexane, 4,4'-dihydroxy-di-phenyl, and so forth.

In the above cited patent, the possibility of using mixtures of mono-substituted alkyl- or aryl-hydroquinones is never mentioned, nor mentioned is the possibility of using them in the presence of substantial amounts of corresponding di-substituted derivatives, which are generally formed in hydroquinone alkylation reactions.

Although not explicitly stated, one skilled in the art will clearly understand that the di-substituted derivatives are not mentioned among the possible aromatic diols accompanying the mono-substituted hydroquinone, owing to the fact that these products, due to steric hindrance, are affected by, and could lead to the disappearance of the liquid-crystalline properties of the end polymer.

In fact, it is known, for example from U.S. Pat. No. 4,600,765, that when aralkyl-substituted hydroquinone, such as, e.g., (1-phenyl-ethyl)-hydroquinones, are used in the preparation of liquid-crystalline, thermotropic polyesters, such a product should be preferably used at a purity higher than 96%, as computed relative to the mixture containing mono-and di-substituted products.

The present inventors have now discovered that mixtures containing hydroquinones mono-substituted with aralkyl groups, and possibly, substantial amounts of corresponding di-substituted hydroquinones, may be used in the preparation of liquid-crystalline, thermotropic, aromatic polyesters.

Therefore, the object of the present invention are the liquid-crystalline, thermotropic, aromatic polyesters comprising:

(a) units derived from at least one aromatic or cycloaliphatic dicarboxy acid;

(b) units derived from a mixture of at least two hydroquinones mono-substituted with aralkyl groups containing at least 7 carbon atoms; and (c) possibly, units derived from at least one hydroquinone di-substituted with the aralkyl groups as defined under (b).

According to a preferred form of a practical embodiment of the polyesters of the present invention, the aralkyl groups present as substituents on hydroquinone contain from 7 to 15 carbon atoms, and the aromatic or aliphatic dicarboxy acid is present in an amount of at least 90 mol % in the isomeric form having mutually parallel or coaxial carboxy groups.

Examples of suitable dicarboxy acids are terephthalic acid, chloro-, bromo-terephthalic acid, methyl-terephthalic acid, 1,4-naphthalene-dicarboxy acid, 1,5-naphthalene-dicarboxy acid and 2,6-naphthalene-dicarboxy acid, 4,4'-di-phenyl-dicarboxy acid, 3,3'-dibromo-4,4'-di-phenyl-dicarboxy acid, 4,4'-stilbene dicarboxy acid, cyclohexane-dicarboxy acid, and so forth.

Any hydroquinones mono- or di-substituted with aralkyl groups may be used in the preparation of the aromatic polyesters of the present invention, although (1-phenyl-ethyl)-hydroquinone, 2,5-bis(phenyl-ethyl)-hydroquinone, 2-(alpha-phenyl-isopropyl)-hydroquinone, 2,5-bis(alpha-phenyl-isopropyl)hydroquinone, and so forth, are preferred.

According to a further preferred form of practical embodiment of the liquid-crystalline, thermotropic, aromatic polyesters of the present invention, the units derived from the dicarboxy acid are in an equimolecular ratio with respect to the units derived from the mono- and di-substituted hydroquinones as defined above under (b) and (c). The mixture of the hydroquinones as defined under (b) is such as to contain substantial amounts, and preferably, equimolecular amounts, of the individual components, whilst the units as defined under (c) are in a molar ratio of (c)/(b) to the units as defined under (b), which is within the range of from 0 to 4, and preferably from 0.05 to 2.5, and still more preferably, from 0.1 to 2.5.

Particularly preferred thermotropic polymers are those which comprise the following repeating units:

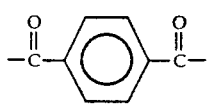 (I)

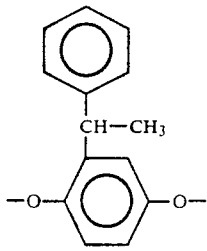 (II)

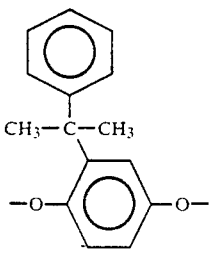 (III)

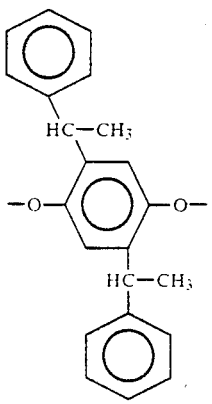 (IV)

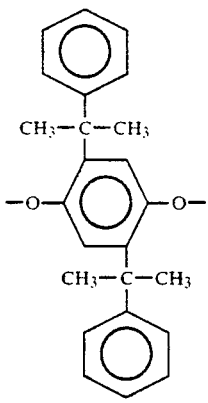 (V)

wherein the molar ratio of (IV+V)/(II+III) is within the range of from 0 to 4, preferably from 0.05 to 2.5, and, still more preferably, from 0.1 to 2.5, whilst the molar ratio of (II)/(III) is within the range of from 0.5 to 1.8, and is preferably equal to 1, and the ratio of (V)/(IV) is within the range of from 0 to 1.

The liquid-crystalline, thermotropic, aromatic polyesters according to the present invention are optically anisotropic in the molten state, as can be verified by means of optical microscopy analysis under polarized light, and have an inherent viscosity, as measured in a 1:1 mixture of trifluoroacetic acid and methylene chloride at 30° C. at a concentration of 0.25 g/liter, within the range of from 0.3 to 4.

Their melting temperature may be within a wide range, according to the composition of the polymer and the degree of polymerization; generally, such a melting temperature is within the range of from 200° to 350° C.

The molecular weight and the crystallinity may be increased by heating the polymer particles in an inert medium, or under vacuum, at a temperature just under the melting point, for a time ranging from 1 to 20 hours.

Furthermore, the polyesters according to the present invention are well suited for use in obtaining manufactured articles which may be prepared by means of the usual thermoplastic polymer processing techniques such as, e.g., injection molding or extrusion. They may be processed to yield films or fibers, or used as matrices for composite materials containing inorganic fibers or fillers, or used in the preparation of blends with other polymers.

The preparation of the liquid-crystalline polymers according to the present invention may be carried out by reacting the above-mentioned units, available from the market, or easily preparable by means of the usual techniques of organic chemistry, according to conventional techniques, under the normal conditions of preparation of polyester resins.

For example, the liquid-crystalline polyesters according to the present invention may be obtained in the molten state, or in the presence of a dispersing medium having a high boiling point such as di-phenyl-sulphone or mixtures of partially hydrogenated terphenyls, by transesterification between the dicarboxy aromatic acids and the acetates or propionates of phenols, at temperatures within the range of from 270° to 370° C., so as to favor the complete release of the carboxy acids, as well as also operating under vacuum.

The reaction may be optionally carried out in the presence of transesterification catalysts such as, e.g., alkali metal or alkali-earth metal phosphates.

Further catalysts may be those which are commonly used in polycondensation processes, and are described in "Encyclopaedia of Polymer Science and Technology," 1969, Vol. 10, pages 722-723.

Examples of such catalysts are the oxides, hydroxides, hydrides, halides, alkoxides or phenates, the salts and the complex salts of the organic or inorganic acids of lithium, sodium, potassium, magnesium, calcium, titanium, manganese, cobalt, zinc, tin, antimony, lanthanum, cerium, lead, and germanium.

The required amount of catalyst is within the range of from 0.005 to 1% by mol, and is preferably within the range of from 0.01 to 0.2% by mol, as computed relative to the total amount of the reactants.

According to an alternative method, the liquid-crystalline polyesters of the present invention may be obtained in solution, by polycondensation between the halides of the dicarboxy aromatic acids and the mixture of the phenols in a suitable solvent. The temperature is within the range of from 25° to 220° C., and the reaction is carried out in the presence of a base and/or of a stream of nitrogen in order to favor the elimination of the hydrogen halide.

Among the bases, pyridine is preferred, whilst among the solvents, the chlorinated, both aliphatic and aromatic, solvents, are preferred, such as methylene chloride, chloro-benzenes, dichloro-benzenes, and trichloro-benzenes.

The so-obtained polymer is subsequently recovered by evaporating the solvent, or by precipitation with a non-solvent, and subsequent filtration.

In order still better to illustrate the present invention and to practice it, some illustrative, non-limitative examples are reported below.

EXAMPLE 1

To a 4-neck flask of 250 cc capacity equipped with mechanical stirring means, condenser, and nitrogen inlet tube, 8.64 g (42.55 mM) of terephthalic acid dichloride, 4.55 g (21.275 mM) of 1-phenylethyl-hydroquinone, 4.85 g (21.275 mM) of (alpha-phenyl-isopropyl)-hydroquinone, and 170 cc of 1,2,4-trichlorobenzene are charged under a slow nitrogen stream.

The reaction mixture is kept 20 minutes at room temperature with stirring and under a nitrogen stream, and then heating is started, and the temperature is increased up to 220° C.

The reaction mixture is maintained at this temperature for 16 hours, until the evolution of HCl has practically ceased.

The mixture is allowed to cool, still under a nitrogen stream and with stirring.

When the reaction mixture reaches the temperature of 50° C., the jelly-like mass is poured into acetone and the precipitate is filtered off.

To so-obtained polymer is washed with acetone (twice), hot water (twice), and acetone/methanol (twice).

The end product is dried under vacuum for 3 hours at 180°–185° C.

The dried polymer has a melting temperature ($T_m$) of 332° C., and a crystallization temperature ($T_c$) of 281° C. The melting temperature and the crystallization temperature are determined by means of D.S.C.—Differential Scanning Calorimetry—at a scanning rate of 20° C./minute.

The inherent viscosity is 0.68 (as measured at the temperature of 30° C. in a solvent composed of equal volumes of trifluoroacetic acid and methylene chloride, at a concentration of 0.25 g/liter).

The molten polymer is optically anisotropic when observed at the microscope under polarized light.

After heating for 5 hours at 290°–300° C. under a nitrogen stream, the polymer shows a melting temperature ($T_m$) of 337° C., a crystallization temperature ($T_c$) of 286° C., and an inherent viscosity of 1.80.

The crystallinity has increased from 13 to 20% by volume.

EXAMPLE 2

To a 4-neck flask of 250 cc capacity equipped with mechanical stirring means, condenser, and nitrogen inlet tube, 6 g (29.55 mM) of terephthalic acid dichloride 1.58 g (7.38 mM) of (1-phenyl-ethyl)-hydroquinone, 2.348 g (7.38 mM) of 2,5-bis(phenyl-ethyl)-hydroquinone, 1.682 g (7.38 mM) of (alpha-phenyl-isopropyl)-hydroquinone, 2.553 g (7.38 mM) of 2,5-bis(alpha-phenyl-isopropyl)-hydroquinone, and 130 cc of 1,2,4-trichloro-benzene are charged under a slow nitrogen stream.

The reaction mixture is kept 20 minutes at room temperature with stirring and under a nitrogen steam, and then heating is started, and the temperature is increased up to 220° C.

The reaction mixture is maintained at this temperature for 14 hours, until the evolution of HCl has practically ended. The mixture is allowed to cool, still under a nitrogen stream and with stirring.

When the reaction mixture reaches the temperature of 50° C., the jelly-like mass is poured into acetone and the precipitate is filtered off.

The so-obtained polymer is washed with acetone (twice), hot water (twice), and acetone/methanol (twice).

The end product is dried under vacuum for 3 hours at 180°–185° C.

The dried polymer has a glass transition temperature ($T_g$) of 145° C., a melting temprature ($T_m$) of 244° C., and a crystallization temperature ($T_c$) of 193° C. The inherent viscosity is 0.95.

The molten polymer is optically anirotropic when observed at the microscope under polarized light.

EXAMPLES 3—4—5

Other polyesters were prepared according to the same procedure as disclosed in Example 2.

The amounts of the reactants expressed as moles, and the characteristics of the polyesters are listed in Table 1.

TABLE 1

| Example | (a) | (b) | (c) | (d) | (e) | $\eta$ | $T_m/°C.$ | $T_c/°C.$ | $T_g/°C.$ |
|---|---|---|---|---|---|---|---|---|---|
| 3 | 1 | 0.15 | 0.15 | 0.35 | 0.35 | 0.67 | — | — | 151 |
| 4 | 1 | 0.35 | 0.35 | 0.15 | 0.15 | 1.27 | — | — | 150 |
| 5 | 1 | 0.40 | 0.40 | 0.10 | 0.10 | 1.43 | 276 | 216 | 153 |

(a) = terephthalic acid dichloride
(b) = (1-phenyl-ethyl)-hydroquinone
(c) = (alpha-phenyl-isopropyl)-hydroquinone
(d) = 2,5-bis(phenyl-ethyl)hydroquinone
(e) = 2,5-bis(alpha-phenyl-isopropyl)hydroquinone
$\eta$ = intrinsic viscosity, measured at the temperature of 30° C. in a solvent composed of equal volumes of trifluoroacetic acid and methylene chloride, at a concentration of 0.25 g/liter.
$T_m$, $T_c$, $T_g$ = the melting temperature, the crystallization temperature, and the glass transition temperature, respectively, as measured by D.S.C. (Differential Scanning Calorimetry), at a scanning rate of 20° C./minute.

The polymers of Examples 3, 4, and 5, when observed at the microscope equipped with a heating stage under polarized light, are optically anisotropic in the fluid state.

What is claimed is:

1. A liquid-crystalline, thermotropic, aromatic polyester which comprises:
    (a) units derived from at least one aromatic or cycloaliphatic dicarboxy acid;

(b) units derived from a mixture of at least two hydroquinones mono-substituted with aralkyl groups containing at least 7 carbon atoms;

(c) optionally units derived from at least one hydroquinone di-substituted with the aralkyl groups as defined under (b).

2. A polyester according to claim 1, wherein the aralkyl groups, present as substituents on hydroquinone, contain from 7 to 15 carbon atoms, and the aromatic or cycloaliphatic dicarboxy acid is present in an amount of at least 90 mol % in the isomeric form having the carboxy groups mutually parallel or coaxial.

3. A polyester according to claim 1 or 2, wherein the dicarboxy acids are selected from the group consisting of terephthalic acid, chloro-, bromo-terephthalic acid, methyl-terephthalic acid, 1,4-naphthalene-dicarboxy acid, 1,5-naphthalene-dicarboxy acid, and 2,6-naphthalene-dicarboxy acid, 4,4'-diphenyl-dicarboxy acid, 3,3'-dibromo-4,4'- diphenyl-dicarboxy acid, 4,4'-stilbene-dicarboxy acid, and cyclohexane-dicarboxy acid.

4. A polyester according to claims 1 or 2, wherein the mono-aralkyl-substituted or di-aralkyl-substituted hydroquinones are selected from the group consisting of (1-phenyl-ethyl)-hydroquinone, 2.5-bis(phenyl-ethyl)-hydroquinone, 2-(alpha-phenyl-isopropyl)-hydroquinone, and 2,5-bis(alpha-phenyl-isopropyl)-hydroquinone.

5. A polyester according to claim 1 or 2, wherein the units derived from the mono- and di-substituted hydroquinones as defined under (b) and (c) are in a molar ratio of (c)/(b) within the range of from 0 to 4.

6. A polyester according to claim 1 or 2, comprising the following repeating units:

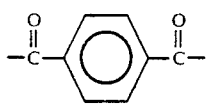
(I)

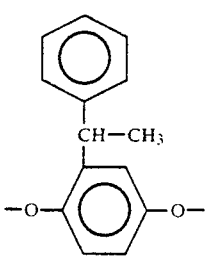
(II)

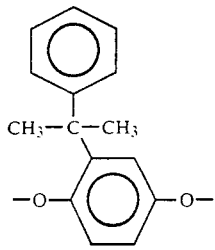
(III)

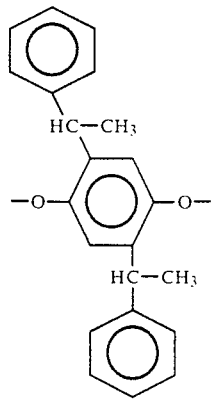
(IV)

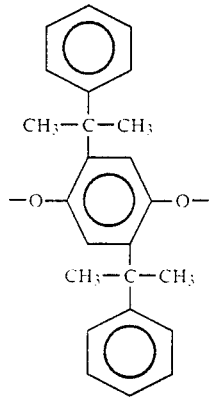
(V)

wherein the molar ratio of (IV+V)/(II+III) is within the range of from 0 to 4, whilst the molar ratio of (II)/(III) is within the range of from 0.5 to 1.8, and the ratio of (V)/(IV) is within the range of from 0 to 1.

7. A polyesters according to claim 1 or 2, having an inherent viscosity, measured in a 1:1 mixture of trifluoroacetic acid and methylene chloride at 30° C., at a concentration of 0.25 g/liter, within the range of from 0.3 to 4 dl/g, and a melting temperature within the range of from 200° to 350° C.

8. A matrix for composite material based on inorganic fibers or fillers made from a polyester according to claim 1 or 2.

9. A polyester according to claim 5 wherein the molar ratio of (c)/(b) is within the range of from 0.05 to 2.5.

10. A polyester according to claim 5 wherein the molar ratio of (c)/(b) is within the range of from 0.1 to 2.5.

11. A polyester according to claim 6 wherein the molar ratio of (IV+V)/(II+III) is within the range of 0.05 to 2.5 and the molar ratio of (II)/(III) is equal to 1.

12. A polyester according to claim 6 wherein the molar ratio of (IV+V)/(II+III) is within the range of 0.1 to 2.5 and the molar ratio of (II)/(III) is equal to 1.

* * * * *